United States Patent [19]

Furubotten

[11] Patent Number: 4,645,262
[45] Date of Patent: Feb. 24, 1987

[54] CAMP CHAIR THAT CONVERTS TO A HAND TRUCK

[76] Inventor: Douglas S. Furubotten, 5903 Fallbrook Ave., Woodland Hills, Calif. 91367

[21] Appl. No.: 800,522
[22] Filed: Nov. 21, 1985
[51] Int. Cl.⁴ ............................................. A47C 13/00
[52] U.S. Cl. .................. 297/129; 280/47.21; 280/47.29
[58] Field of Search ............... 297/129; 280/648, 650, 280/654, 655, 645, 659, 43.1, 43.24, 47.18, 47.21, 47.29

[56] References Cited

U.S. PATENT DOCUMENTS 2,845,278 7/1958 Breeler ................................ 280/454
3,285,654 11/1966 Cramer ........................... 297/129 X
3,726,536 4/1973 Deloizarra ........................... 280/468
3,930,662 1/1976 Manner ............................... 280/468
4,376,547 3/1983 Dominko ....................... 280/654 X Primary Examiner—James T. McCall
Attorney, Agent, or Firm—Robert Louis Finkel

[57] ABSTRACT

The seat of this camp chair has a downwardly projecting support at its forward end and a pair of wheels at its rear end. A back support having a load-bearing platform extending forwardly of its lower end is pivotably mounted to the seat forwardly of the wheels with the platform positioned below the seat. The seat limits the upward movement of the platform, thereby maintaining the back support in an upright position. Rotation of the forward end of the seat upwardly and rearwardly while the back support is held in a rearwardly inclined position exposes the platform and brings the seat into supporting contact with the back support.

11 Claims, 5 Drawing Figures

CAMP CHAIR THAT CONVERTS TO A HAND TRUCK

BACKGROUND OF THE INVENTION

1. Field of the Invention

This invention relates to camp chairs, intended primarily for use of out-of-doors, and more particularly to foldable camp chairs. Specifically, it is concerned with a camp chair adapted to be readily converted to a hand truck for transporting loads over soft or irregular surfaces.

2. Prior Art

I have observed that the pleasure we derive from an outing at the beach or a picnic in the country varies inversely with the mass of the assemblage of ice chests, lunch baskets, blankets, sweaters, baseball gloves, diving masks, "Frisbies", and sundry paraphenalia which we have come to believe are essential to the day's success. Carrying a heavy armload of provisions from parking lot to water's edge or picnic site is simply not enjoyable. Clearly a cart or dolly adapted to be wheeled on soft sand and irregular surfaces would provide a highly useful alternative.

A number of prior art carriers have been designed with this use in mind. Some of these are adapted to be converted to a chair when no longer needed for hauling cargo. The advantages of this feature are apparent. Generally, however, such dual-purpose devices are fragile articulated structures which are cumbersome and awkward to use and not entirely suitable for either purpose. In practice they often prove to be more of a nuisance than a benefit to the already overburdened outdoor enthusiast.

Many of these shortcomings stem from the fact that these devices were designed primarily as wheeled vehicles, with their use for seating treated as a matter of secondary concern. My approach has been to develop a structure that is first and foremost a seat or lounge. As a result, my invention overcomes the deficiencies encountered with the prior art devices, while providing all of the advantages of a compact lightweight carrier that is easily handled on any kind of soft or uneven surface and readily convertible to a comfortable yet sturdy camp chair.

SUMMARY OF THE INVENTION

The convertible camp chair of this invention comprises an elongated seat member and a back support. The seat member is normally supported in a generally horizontal position by a pair of wheels which are rotatably mounted to its rear end, and a downwardly projecting support member mounted to its forward end. The lower end of the back support is pivotably connected to the seat member for rotation of the upper end of the back support about a transverse axis just forward of the wheels.

A load-bearing platform rigidly mounted to the lower end of the back support below its point of attachment to the seat member and projecting forwardly thereof at an oblique angle abuts the underside of the seat member and thereby maintains the back support in a normally upstanding position.

The chair is converted to a hand truck by holding the upper end of the back support in an elevated position and raising the forward end of the seat member. This causes the seat member to rotate in an arc centered on the axis of rotation of the wheels, and at the same time to rotate about its pivotal connection with the lower end of the back support, thereby exposing the load-bearing platform.

Rotating the seat member beyond the vertical plane passing through the pivotal axis brings the seat member into contact with the back support and positions the wheels forwardly of the aforementioned vertical plane. In this configuration the back support and seat member are dynamically stable with respect to one another and will remain so regardless of the load placed on the load-bearing platform.

The construction and operation of the invention will become apparent to the reader from the following detailed description of the preferred embodiments illustrated in the accompanying set of drawings.

DETAILED DESCRIPTION OF SEVERAL PREFERRED EMBODIMENTS

Figure 1:
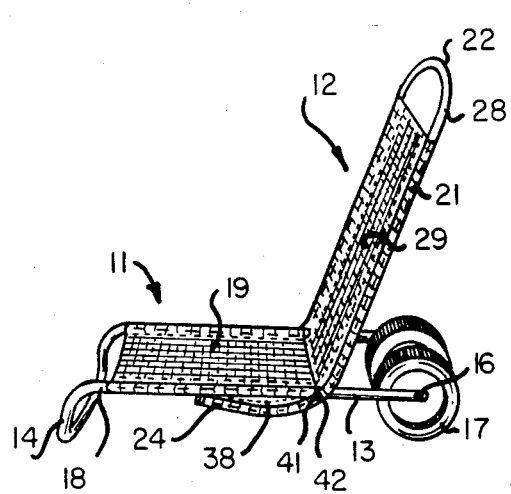
FIG. 1 is a perspective view of a typical camp chair embodying the subject invention.

Referring to FIG. 1, a typical camp chair embodying the subject invention comprises a seat member 11 and a back rest member 12. This embodiment utilizes a lightweight construction in which seat member 11 and back rest member 12 incorporate an open framework adapted to support a flexible web of material, such as canvas, woven or laced rope or plastic strips, or the like, of the type conventionally used in outdoor chairs and lounges. The framework is of aluminum tubing or other suitable structural material of the kind used in such furniture.

Seat member 11 is formed by a pair of parallel tubular side members 13 joined at their forward ends by a downwardly extending cross member 14 and at their rear ends by an axle 16 to which a pair of wheels 17 are mounted. To facilitate the use of the invention on sand and uneven surfaces, balloon tires or oversize rigid wheels are preferrable. Ideally, they should have a diameter of at least six inches and a tread width of at least four inches. Cross member 14 and wheels 17 support seat member 11 in a generally horizontal position, preferably with its forward end somewhat elevated.

Side members 13 define a seat frame 18 across which a flexible web 19 of canvas is shown attached by convenient means to form a chair seat.

Back rest member 12 is similarly formed by a pair of parallel tubular side members 21, joined in this case at the upper ends by cross member 22 to define a generally inverted U-shaped back frame 28. The lower ends 24 of side members 21 project forwardly of the plane containing cross member 22 and side members 21, and as will be seen, form the frame for the load-bearing platform of the invention.

Back frame 28 is pivotably mounted at its lower end to seat frame 18 by conventional means, such as a pair of bolts 41 passing through side members 21 and 13 at each side of back frame 28 and seat frame 18 and secured by lock nuts 42. I prefer to have the mounting point as close as practicable to the wheels 17, however, its exact placement at the rear ends of side members 13 is a matter of choice and may vary, depending on the particular construction used and the handling characteristics desired. The most significant feature of the mounting arrangement resides in the pivotal connector serving as a fulcrum for the lever defined by the back frame 28 and the forwardly projecting lower ends 24 of side members 21.

In addition to providing for relative rotary movement of back rest member 12 and seat member 11, the mounting means give rigidity to back frame 28 and the forwardly projecting lower ends 24 of side members 21, thus permitting a second web 29 of canvas (for example) to be stretched between side members 21 of back rest member 12 to form a flexible back rest. A third flexible web 38 of canvas similarly stretched between the lower ends 24 of side members 21 forms the load-bearing platform referred to earlier.

In the embodiment depicted in FIG. 1, the distance between side members 21 is greater than the width of seat frame 18, and accordingly, the load-bearing platform defined by web 38 is wider than seat frame 18. Thus, as the upper end of back frame 28 is forced rearwardly, under its own weight or in response to someone reclining in the chair, the lower ends 24 of side members 21 rotate upwardly around mounting bolts 41, causing the forwardmost edge of web 38 to come into contact with the underside of seat frame 18, and thereby restraining back frame 28 from further rearward movement.

It will be apparent that similar restraining action would occur if seat frame 18 were wider than back frame 28, the only difference being that the restraining force would be exerted by seat web 19 downwardly against the lower ends 24 of side members 21.

Figure 2:
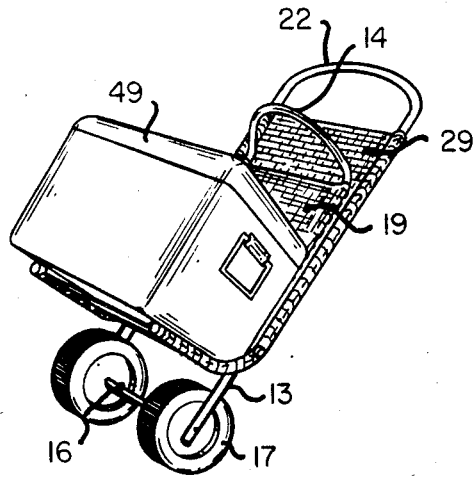
FIG. 2 is a perspective view of the camp chair of FIG. 1 configured as a hand truck.

FIG. 2 illustrates the embodiment of FIG. 1 in its load-bearing configuration. To convert the chair of FIG. 1 to the hand truck of FIG. 2, with back frame 28 supported in its upright position, for example by grasping cross member 22, the forward end of seat frame 18 is raised and pivoted around bolts 41, until what was formerly its upper surface comes into supporting contact with web 29. In this posture, the lower ends 24 of side members 21 are exposed and web 38 is disposed to receive virtually any desired load 49.

As long as wheels 17 remain forward of the imaginary vertical plane passing through the pivotal axis defined by bolts 41, and seat frame 18 and back frame 28 remain to the rear of that plane, the geometry of the invention will insure continuing contact between seat frame 18 and back web 29, regardless of the weight of the load 49.

Figure 3:
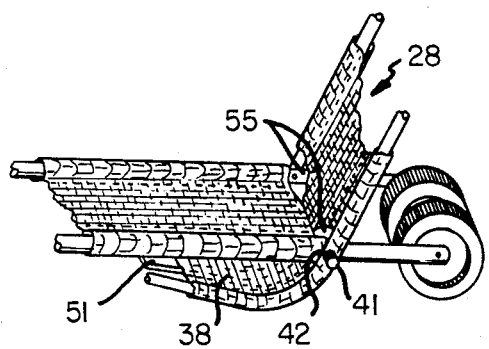
FIG. 3 is a fragmentary perspective view of an alternative embodiment of the invention.

FIG. 3 illustrates a modification of the embodiment of the invention of FIG. 1. In this embodiment, a pair of abutments, such as laterally extending flanges 51, are positioned on seat frame 18 for restraining contact with the forwardly extending lower ends of side members 21. With this arrangement, the force resisting the rearward movement of back frame 28 is exerted by side members 21, rather than by web 38.

In some instances it may be desirable to use a single web 38 to cover the load-bearing platform and back frame 28. For this purpose, openings 55 through which side members 13 of seat frame 18 can be inserted may be provided in the material at the lower corners of the back rest.

Figure 4:
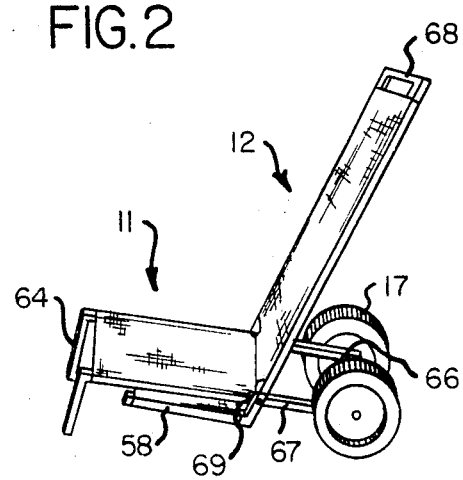
FIG. 4 is a perspective view of another alternative embodiment of the invention.

Still another embodiment is shown in FIG. 4. This device demonstrates that the invention is not dependent on the construction or materials used.

Here, instead of the covered-frame structure of the previously described embodiments, the seat member 11 and back rest member 12 with its forwardly projecting load-bearing platform 58 are unitary pieces formed of solid lumber, molded plastic, or the like. In place of the single cross member 14, a pair of legs 64 support the forward end of seat member 11. Wheels 17 are mounted to an axle 66 carried by struts 67 which may be formed independently and attached by conventional means to seat member 11. Wheels 17 are mounted outside of struts 67 for greater stability, and for convenience a hand-hold 68 is provided at the upper end of back rest member 12.

In the embodiment of FIG. 1, the flexibility of web 29 allowed seat frame 18 to nest within back frame 28, thereby providing solid contact between frame 18 and web 29. Since seat member 11 and back rest member 12 are of solid construction in this embodiment, special pains must be taken to avoid interference between the adjacent edges of members 11, 12, which would prevent them from achieving such contact.

Figure 5:
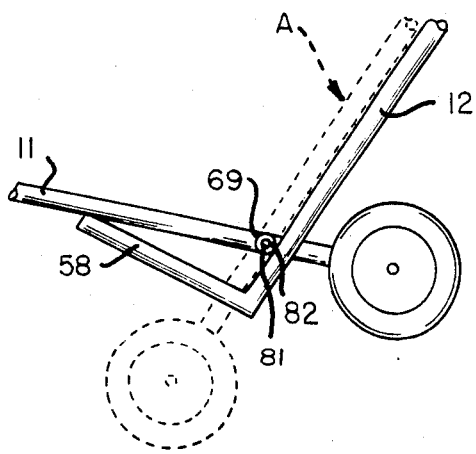
FIG. 5 is a fragmentary side detail of FIG. 4.

One method for accomplishing this is best illustrated in FIG. 5. It employs mounting means, such as a pair of mounting flanges 69, projecting forwardly of the sides of back rest member 12. Back rest member 12 is pivotably mounted to seat member 11 by elongated shaft 81 which passes transversely through seat member 11. The ends of shaft 81 are journalled through bushings inserted in openings provided in flanges 69 (details not shown) and are secured by nuts 82 or other coventional means. With this mounting arrangement, seat member 11 lies flush against back rest member 12 when it is rotated into the load-bearing position represented in phantom and designated by the letter "A".

Despite its radically different construction, the embodiment of FIGS. 4 and 5 operates in precisely the same manner as that of FIG. 1. In each instance, the invention provides means for quickly and easily converting the camp chair to a hand truck, and just as readily returning the hand truck to its original form.

While I have described the invention in terms of several preferred embodiments, it is not to be construed as limited to those embodiments, and they are to be regarded as illustrative rather than restrictive. It is my intention by this specification to cover any and all variations of the examples I have chosen for purposes of the disclosure, which do not depart from the spirit and scope of the following claims.

I claim:

1. A camp chair that converts to a hand truck, comprising:
   an elongated generally planar seat member having a pair of wheels rotatably mounted to one end thereof and a support member projecting downwardly of the plane of said seat member at the other end thereof, said wheels and support member normally supporting said seat member in a generally horizontal position to provide a seat;
   a normally upstanding back rest member having a load-bearing platform rigidly mounted to the lower end thereof and projecting forwardly thereof, said back rest member being pivotably mounted at the lower end thereof to said seat member adjacent said wheels with said load-bearing platform positioned below said seat member and adapted for abutment against the under side of said seat member, whereby said back rest member is supported in a generally upright position by said seat member when said seat member is disposed in a generally horizontal position and said seat member is supported in a generally upright position by said back rest member upon rotation thereof into abutment with said back rest member.

2. The camp chair of claim 1, comprising grasping means at the upper end of said back rest member for manually supporting a load on said platform.

3. The camp chair of claim 1, comprising mounting means on said back rest member pivotably mounting said back rest member to said seat member for rotation about an axis of rotation displaced forwardly of said back rest member, whereby upon rotation into abutment with said back rest member said seat member is substantially parallel with said back rest member.

4. A camp chair that converts to a hand truck, comprising:
- a pair of parallel first side members forming a seat frame, said first side members having a pair of wheels rotatably mounted to one end thereof and being rigidly joined at their other ends by a first cross member projecting downwardly of the plane containing said seat frame, said wheels and first cross member normally supporting said seat frame in a generally horizontal position;
- a pair of parallel normally upstanding second side members rigidly joined at their upper ends by a second cross member to form a generally inverted U-shaped back frame, the lower ends of said second side members projecting forwardly of the plane containing said second cross member and the upper ends of said second side members;
- a first flexible web attached to said first side members said first web extending across said seat frame and providing a seat;
- a second flexible web attached to said second side members, said second web extending across said back frame and providing a back rest;
- a third flexible web attached to the forwardly projecting lower ends of said second side members, said third web extending between said second side members and providing a load-bearing platform;
- connecting means at the lower end of said back frame pivotably mounting said second side members to said first side members, respectively, for rotation of said seat frame into substantial alignment with said back frame;
- first restraining means interacting between the lower end of said back frame and said seat frame for supporting said back frame in a generally upright back-supporting position when said seat frame is disposed in a generally horizontal position; and
- second restraining means interacting between said seat frame and the upper end of said back frame for supporting the end of said seat frame remote from said wheels on said back frame upon rotation of said seat frame through said connecting means to an upstanding position.

5. The camp chair of claim 1, wherein said second side members are pivotably mounted to said first side members adjacent said wheels.

6. The camp chair of claim 5, wherein said first restraining means in said third web, and said second restraining means is said second web.

7. The camp chair of claim 5, wherein said first and second restraining means comprise, respectively, abutments mounted to at least one of said pairs of side members for engagement of the other of said pairs of side members.

8. The camp chair of claim 5, wherein said web is canvas.

9. The camp chair of claim 1, wherein said first cross member projects downwardly of the plane containing said seat frame a distance greater than the radius of said wheels.

10. The camp chair of claim 1, wherein the spacing between said second side members is less than that between said first side members.

11. The camp chair of claim 7, wherein the spacing between said second side members is greater than that between said first side members.

* * * * *